March 24, 1931.  F. J. HYLAND  1,798,087
AUTOMATICALLY TILTABLE WINDSHIELD
Filed Dec. 27, 1928   3 Sheets-Sheet 1
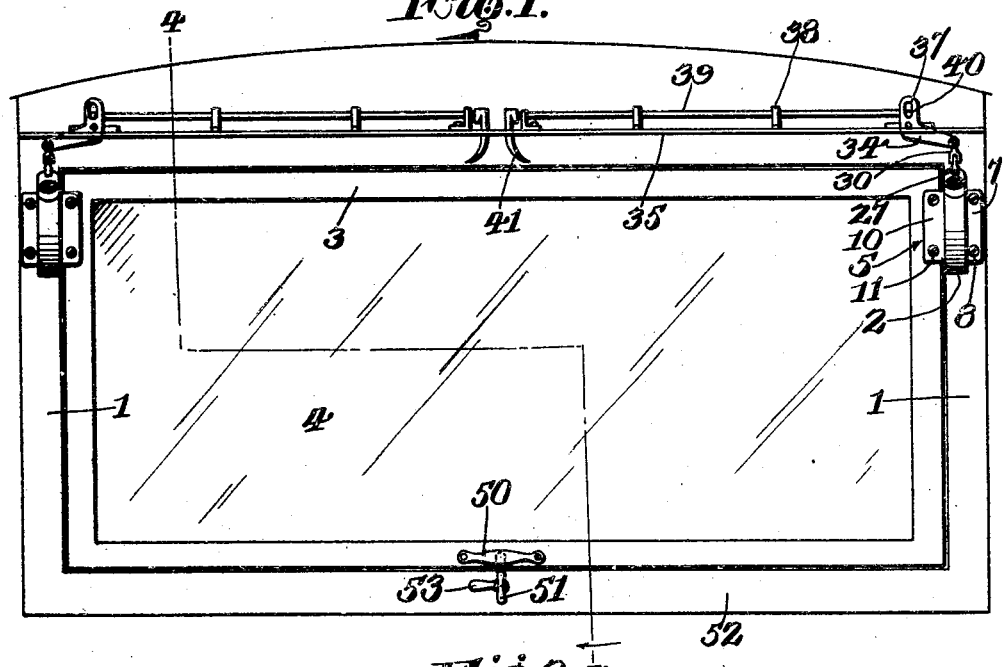
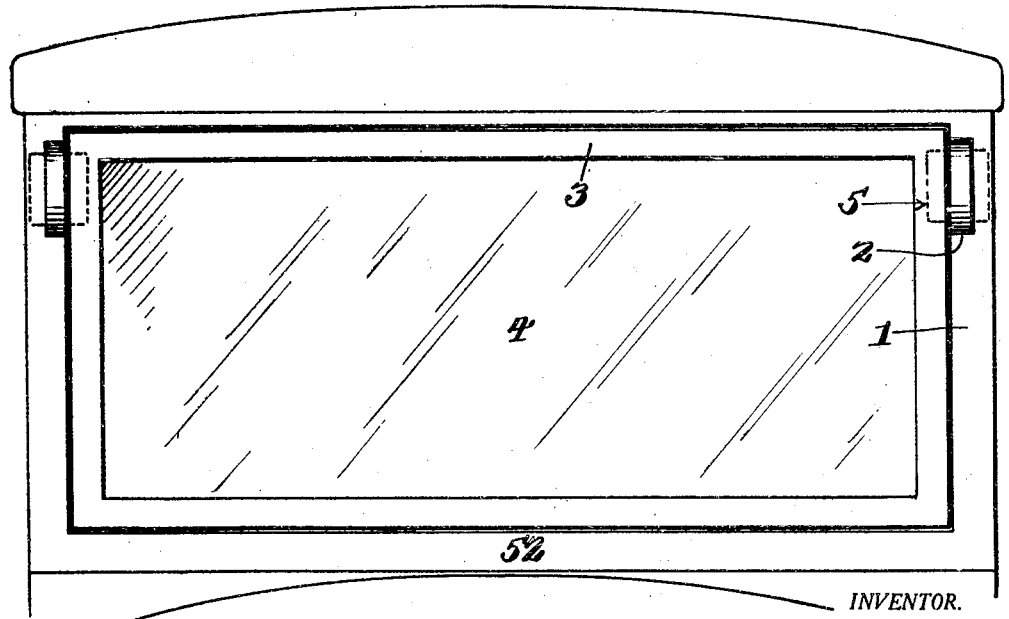
INVENTOR.
Frank J. Hyland,
BY
Geo. P. Kimmel
ATTORNEY.

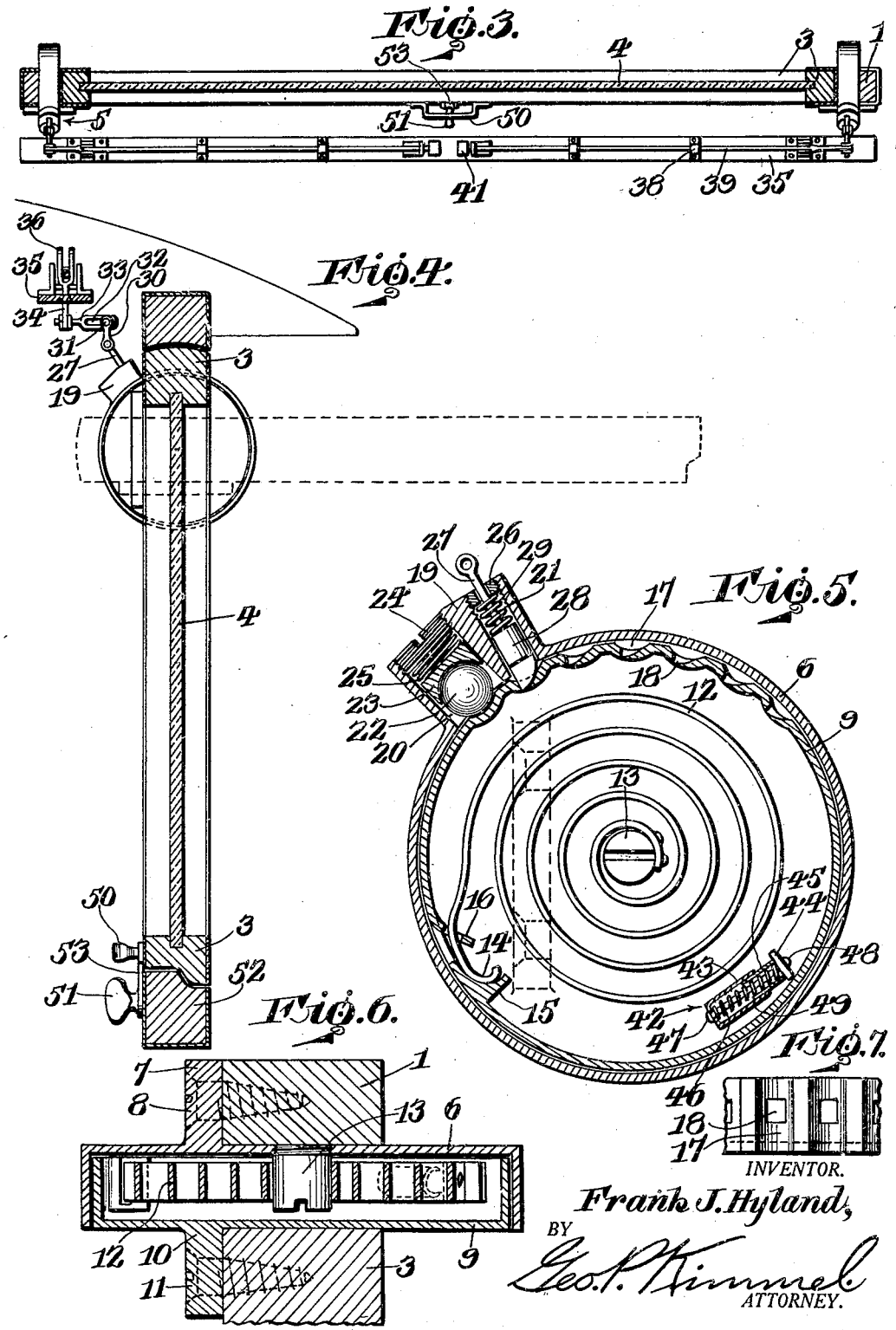

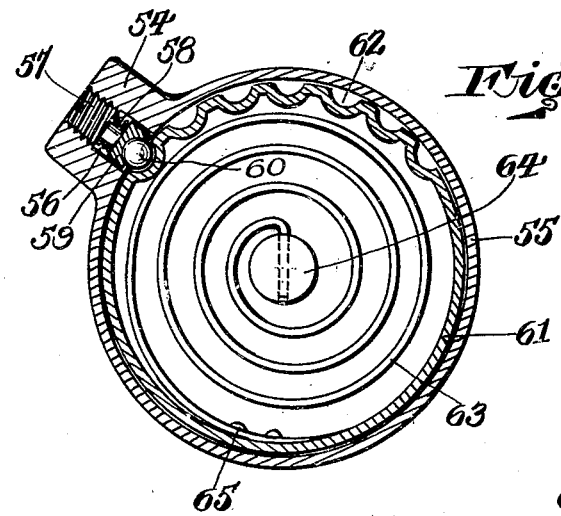
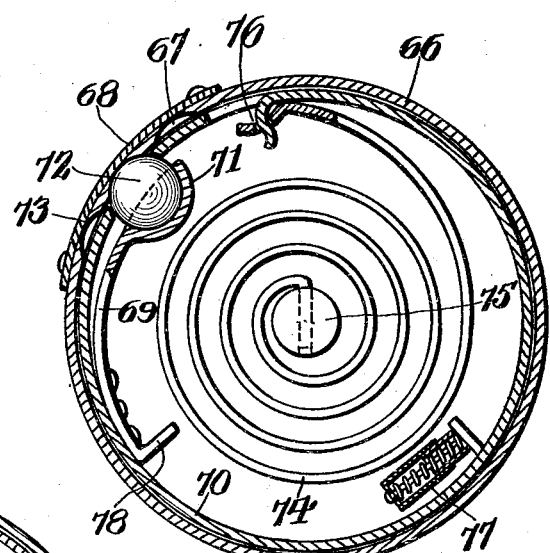
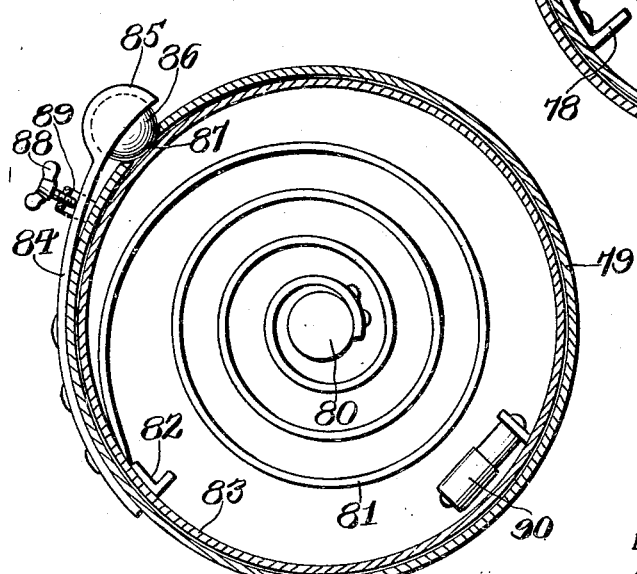

Patented Mar. 24, 1931

1,798,087

UNITED STATES PATENT OFFICE

FRANK J. HYLAND, OF JACKSONVILLE, FLORIDA, ASSIGNOR OF ONE-TENTH TO GEORGE P. KIMMEL, OF WASHINGTON, DISTRICT OF COLUMBIA

AUTOMATICALLY-TILTABLE WINDSHIELD

Application filed December 27, 1928. Serial No. 328,694.

This invention relates to an automatically tiltable windshield particularly adapted for use in connection with motor vehicles.

It is well known that the sudden stopping of a motor vehicle equipped with a windshield of conventional type, as by colliding with some foreign object, transmits a strain to the windshield glass, often with sufficient force to shatter the same, thereby subjecting the occupants of the vehicle to the danger of becoming injured by the flying glass.

The primary object of this invention is to provide, in a manner as hereinafter set forth, a windshield by means of which the occupants of a vehicle may be safe-guarded against injury from flying particles of glass, in the event of the sudden stoppage of the vehicle with sufficient force to shatter the glass as aforesaid.

A further object of the invention is to provide, in a manner as hereinafter set forth, a windshield supported in a manner whereby the windshield will be caused to swing outwardly upon the sudden stopping of a vehicle, thereby relieving the windshield glass from the strain which would otherwise be imparted thereto by the sudden impact of the vehicle with a foreign object.

A further object of the invention is to provide a windshield, by means of which the occupants of a vehicle may be protected from flying particles of glass as aforesaid, without interfering with the normal, manual operation of the windshield for adjusting the same.

With the foregoing and other objects in view, the invention consists of the novel construction, combination and arrangement of parts as hereinafter more particularly described, and illustrated in the accompanying drawings wherein is shown a preferred embodiment of the invention, but it is to be understood that such drawings and description are to be taken as illustrative and that the invention is intended to be limited only by the scope of the claims hereunto appended.

In the accompanying drawings in which like numerals are employed to designate like parts throughout the same:

Figure 1 is an elevation of a windshield constructed in accordance with this invention, as viewed from the inside of a vehicle.

Figure 2 is an elevation thereof looking in the opposite direction.

Figure 3 is a sectional plan thereof.

Figure 4 is a section taken on line 4—4 of Figure 1.

Figure 5 is an enlarged, vertical section through one of the novel supporting members for the windshield.

Figure 6 is an enlarged transverse section through one of the supporting members.

Figure 7 is a fragmentary elevation of a portion of the movable drum of a supporting member.

Figure 8 is a view similar to Figure 5, showing a modified form of supporting member.

Figure 9 is a view similar to Figure 5, showing a further modified form of supporting member.

Figure 10 is a view similar to Figure 5, showing a still further modified form of supporting member.

Referring to the drawings in detail, with reference to Figures 1 to 7, the numeral 1 designates the forward corner posts of a vehicle body, each of which is formed in its inner face with a recess 2, adjacent the upper end thereof. Suspended between the posts 1 is a windshield comprising a frame 3 and a glass 4, the frame 3 being connected with the posts 1 by means of a pair of supporting members indicated generally by the numeral 5.

Each of the supporting members 5 includes an outer, stationary drum 6, formed with a a laterally projecting, vertically disposed web 7 which is secured to a post 1 by means of suitable holdfast devices 8. Positioned within the drum 6 is an oppositely disposed, movable drum 9, which is formed with a laterally extending, vertically disposed web 10 secured to the frame 3 by means of suitable holdfast devices 11. Coiled within the drum 9 is a spring 12, the inner end of which is secured to a supporting screw 13, disposed centrally of the drum 6 and extending therethrough into a post 1. The outer end of the spring 12 is bent into a curve, as indicated at 14, and abuts against a lug 15 formed on the inner surface of the movable drum 9. Spaced from the lug 15, an apertured lug 16 projects from the drum 9 and the spring 12 extends therethrough.

The outer periphery of the drum 9 is formed with a series of closely arranged depressions 17, each of which is provided in the bottom thereof with a notch 18 having a vertical rear wall and an arcuate bottom and forward wall. Projecting upwardly and rearwardly from the drum 6 is a boss 19, which is formed with a pair of openings 20 and 21 extending longitudinally therethrough. With the windshield in closed position the rearmost of the depressions 17 is in registry with the opening 20 and the adjacent depression 17 is in registry with the opening, 21. Disposed within the opening 20 is a ball 22 which is adapted to seat in one of the depressions 17. Slidably disposed within the opening 20 is a block 23, the lower face of which is of arcuate contour in order that the block may snugly seat on the ball 22. The outer end portion of the wall of the opening 20 is internally threaded for engagement with a set screw 24, which coacts with a coiled spring 25 to exert a force on the block 23, thereby forcing the ball 22 into engagement with the wall of the depression 17. The ends of the spring 25 respectively abut against the upper face of the block 23 and the lower face of the set screw 24, and by adjusting the set screw 24, the force exerted on the ball 22 may be varied as desired.

The outer end portion of the wall of the opening 21 is internally threaded for engagement with an apertured nut 26, through which extends the stem 27 of a pawl 28, the lower end of which is adapted for engagement with one of the notches 18. An inward pressure is exerted on the pawl 28 by means of a coiled spring 29, the ends respectively of which abut against the upper face of the pawl 28 and the lower face of the nut 26. Connected with the pawl 28 is a manually operated releasing mechanism including a link 30, one end of which is pivotally connected to the upper end of the stem 27. The opposite end of the link 30 is bifurcated and provided with a transversely extending pin 31 which extends loosely through a slot 32 disposed longitudinally of a connecting member 33. The member 33 extends from the link 30 in a rearward direction and the rearward end thereof is rigidly connected with a bell crank 34 which is pivotally mounted on a supporting member 35 secured to the vehicle body above the plane of the windshield. The bell crank 35 extends through a slot, not shown, in the supporting member 35 and the upper end of the bell crank is formed with a bifurcation 36 which is provided with a pair of aligned, longitudinally extending slots 37. Seated on the upper face of the supporting member 35 is a plurality of up-standing, apertured lugs 38, through which a pull rod 39 slidably extends. Formed on one end of the pull rod 39 is a pair of oppositely extending fingers 40 which loosely extend through the slots 37. The opposite end of the pull rod 39 is provided with a grip member 41 which projects downwardly through a slot, not shown, in the supporting member 35. There are two supporting members 5 for the windshield, each of which is provided with a pawl actuating mechanism as above described. The pull rods 39 of the two mechanisms extend toward each other and the grip members 41 therefor are disposed in spaced relation adjacent the center of the vehicle transversely thereof. With the grip members 41 so disposed, they may be simultaneously grasped by one hand and moved toward each other which simultaneously releases the pawls of the two supporting members 5.

With the windshield in closed position, the curved end 14 of the spring 12 is constantly exerting a pressure on the lug 15 which is insufficient to overcome the pressure of the ball 22 against the wall of the rearmost depression 17. Upon the sudden stopping of the vehicle, the pressure of the ball 22 against the wall of the rearmost depression 17 will be overcome, and the drum 9 will be rotated within the drum 6. When the foremost depression 17 is brought into registry with the opening 21, the pawl 28 engages the notch 18 of the foremost depression, thereby maintaining the windshield in open position.

To resist the latter portion of the opening movement of the windshield, I provide each of the supporting members 5 with a shock absorber, indicated generally by the numeral 42. Each shock absorber 42 includes a cylinder 43, which is disposed forwardly of the lug 15 in spaced relation thereto and is slidably mounted on a guide member 45 projecting from a lug 44 which is secured to the inner face of the drum 6. Extending through the cylinder 43 and guide member 45 is a bolt 46, which is formed at its rearward end with a head 47 abutting against the rearward end of the cylinder 43. The bolt 46 extends loosely through an aperture, not shown, in the lug 44 and terminates at its forward end in a head 48 to prevent the withdrawal of the bolt 46 from the lug 44. Disposed within the cylinder 43 and guide member 45 is a coiled spring 49, which is coiled around the bolt 46 and the ends respectively of which abut against the inner face of the rearward end of the cylinder 43 and rearward face of the lug 44. Upon the rotation of the drum 9 within the drum 6, the forward face of the lug 15 abuts against the head 47 and the compression of the spring 49 resists further movement of the drum 9, thereby retarding the latter part of the movement of the windshield and preventing any shock thereto.

The windshield may be adjusted in different open positions by forcing the same open by hand to selectively engage the pawl 28 with the notches 18. The pawl 28 will prevent the windshield from closing until the pawl releasing mechanism is actuated by means of the grip member 41. The windshield may be conveniently operated manually by means of a handle member 50 which is secured to the frame 3 and the central portion of which is spaced from the frame. The wind-shield may be locked in closed position by means of a latch member 51 which is pivoted to the frame 52 of the vehicle and which is formed with a finger 53 adapted to be positioned between the handle member 50 and frame 3 upon the rotation of the latch member 51.

Referring to Figure 8 of the drawings, the boss 54 formed on the outer drum 55 is provided with a single opening 56, within which is disposed a set screw 57, spring 58, block 59, and ball 60. The inner drum 61 is formed in its outer periphery with a series of depressions 62 which are adapted to selectively seat the ball 60. Disposed within the drum is a coiled spring 63, the inner end of which projects through an apertured lug 64 secured to the inner face of the drum 55, and the outer end of which is fixedly secured, as indicated at 65 to the inner drum 61. By adjusting the set screw 57, the pressure of the balls 60 against the wall of the rearmost depression 62 may be varied as desired, to resist the action of the spring 63, which normally exerts a pressure on the inner drum 61.

Referring to Figure 9 of the drawings, the outer drum 66 is formed in its inner periphery with a series of depressions 67 and is reinforced adjacent the depressions by means of a plate 68. A resilient element 69 is secured at one end to the inner drum 70 and is formed with a cup-shaped free end 71, within which is seated a ball 72.

Adjacent the ball 72, the inner drum 70 is formed with an opening 73 which may be brought into selective registry with the depressions 67 to adjust the windshield at different open positions. Disposed within the drum is a coiled spring 74, the inner end of which is secured to a lug 75 carried by the outer drum 66, and the outer end of which is secured to an ear 76 stamped from the inner drum 70. Upon the rotation of the drum 70 beyond the points of adjustment for the windshield, the ball 72 rides along the inner face of the drum 66, in which position only a frictional resistance between the ball 72 and drum 66 is offered to the relative movement of the drum. The latter portion of the movement of the drum 70 is resisted by a shock absorber 77, which is of the same construction as the shock absorber 42 heretofore described, and which is disposed in the path of an inwardly projecting lug 78 formed on the resilient element 69.

Referring to Figure 10 of the drawings, the outer drum 79 is provided with a stud 80, to which one end of a spring 81 is secured, the opposite end of the spring abutting against a stop 82 secured to the inner face of the inner drum 83. Secured to the outer periphery of the outer drum 79 is a resilient element 84, which is formed with a free cup-shaped end 85 adapted to have seated therein a ball 86. Adjacent the ball 86, the outer drum 79 is formed with an opening 87, through which the ball 86 projects into frictional engagement with the outer face of the inner drum 83. The pressure of the ball 86 against the drum 83 may be varied as desired by means of an adjusting screw 88 which extends through a bracket 89 carried by the drum 79, and the end of which abuts against the outer face of the resilient element 84. A shock absorber 90 is carried by the drum 79 which coacts with the stop 82 to retard the latter portion of the movement of the drum 83 in the same manner as heretofore described in connection with the shock absorber 42 illustrated in Figure 5.

It is thought that the many advantages of a windshield in accordance with this invention will be readily apparent, and although the preferred embodiments are as illustrated and described, yet it is to be understood that changes in the details of construction may be made which fall within the scope of the invention as claimed.

What I claim is:

1. In a combined adjusting and controlling mechanism for the windshield of a motor vehicle, a stationary and a rotatable, adjustable member providing a pivot for the windshield, pressure exerting means within and acting on said adjustable member for permanently tending to shift it in a direction to open the windshield, and a latching device releasably engaging one member with the other to arrest movement of the adjustable member and capable of being automatically released from such engagement upon the sudden stoppage of the motor vehicle whereby said pressure exerting means will automatically shift the windshield to open position.

2. In a combined adjusting and controlling mechanism for the windshield of a motor vehicle, a stationary and a rotatable, adjustable member providing a pivot for the windshield, pressure exerting means within and acting on said adjustable member for permanently tending to shift it in a direction to open the windshield, and a latching device releasably engaging one member with the other to arrest movement of the adjustable member and capable of being automatically released from such engagement upon the sudden stoppage of the motor vehicle whereby said pressure exerting means will automatically shift the windshield to open position, said pressure exerting means consisting of a coiled spring having one end connected with the stationary member and having its other end engaging the adjustable member.

3. In a combined adjusting and controlling mechanism for the windshield of a motor vehicle, a stationary and a rotatable, adjustable member providing a pivot for the windshield, pressure exerting means within and acting on said adjustable member for permanently tending to shift it in a direction to open the windshield, and a latching device carried by one member and releasably engaging the other to arrest movement of the adjustable member and capable of being automatically released from such engagement upon the sudden stoppage of the motor vehicle whereby said pressure exerting means will automatically shift the windshield to open position, said latching device comprising an element carried by one member and frictionally engaging the other member.

4. In a combined adjusting and controlling mechanism for the windshield of a motor vehicle, a stationary and a rotatable, adjustable member providing a pivot for the windshield, pressure exerting means within and acting on said adjustable member for permanently tending to shift it in a direction to open the windshield, a latching device carried by one member and releasably engaging the other to arrest movement of the adjustable member and capable of being automatically released from such engagement upon the sudden stoppage of the motor vehicle whereby said pressure exerting means will automatically shift the windshield to open position, and means for retarding the opening movement of the windshield during the latter portion of the travel of the latter to protect the windshield against shock.

5. In a combined adjusting and controlling mechanism for the windshield of a motor vehicle, a stationary and a rotatable, adjustable member providing a pivot for the windshield, pressure exerting means within and acting on said adjustable member for permanently tending to shift it in a direction to open the windshield, a latching device carried by one member and releasably engaging the other to arrest movement of the adjustable member and capable of being automatically released from such engagement upon the sudden stoppage of the motor vehicle whereby said pressure exerting means will automatically shift the windshield to open position, and means for retarding the opening movement of the windshield during the latter portion of the travel of the latter to protect the windshield against shock, said last named means comprising a rigid element fixedly secured to each of said members, and a resilient element secured at one end with one of said rigid elements and having its other end extending toward the other of said rigid elements.

6. In a combined adjusting and controlling mechanism for the windshield of a motor vehicle, a stationary and a rotatable, adjustable member providing a pivot for the windshield, pressure exerting means within and acting on said adjustable member for permanently tending to shift it in a direction to open the windshield, a latching device carried by one member and releasably engaging the other to arrest movement of the adjustable member and capable of being automatically released from such engagement upon the sudden stoppage of the motor vehicle whereby said pressure exerting means will automatically shift the windshield to open position, and means for retarding the opening movement of the windshield during the latter portion of the travel of the latter to protect the windshield against shock, said last named means comprising a rigid element secured to one of said members, a pair of telescoping tubular elements, one of which is secured to the other of said members and the other of which projects toward said rigid element, and a compression spring disposed within said tubular elements to resist the telescoping action thereof.

7. In a combined adjusting and controlling mechanism for the windshield of a motor vehicle, a stationary and a rotatable, adjustable member providing a pivot for the windshield, pressure exerting means within and acting on said adjustable member for permanently tending to shift it in a direction to open the windshield, and a latching device carried by one member and releasably engaging the other to arrest movement of the adjustable member and capable of being automatically released from such engagement upon the sudden stoppage of the motor vehicle whereby said pressure exerting means will automatically shift the windshield to open position, said latching device further providing means for latching the windshield in selected positions to prevent the closing thereof.

8. A safety wind shield for automobiles or the like comprising a main frame, an auxiliary frame pivotally connected to the main frame, frictional means for normally holding the auxiliary frame in a closed position, and resilient means for moving the auxiliary frame to an open position when released from the frictional holding means, the frictional holding means being released by the momentum of the frame when the automobile comes to a sudden stop, substantially as set forth.

9. A safety windshield for automobile bodies comprising a windshield frame adapted to be pivotally connected with an automobile body, frictional means for normally holding the frame in closed position, and resilient means for moving the frame to open position when released from the frictional holding means, the frictional holding means being released by the momentum of the frame when the automobile body comes to a sudden stop.

10. In a pivotally supported windshield for a vehicle, frictional means for normally holding the windshield against pivotal movement, and resilient means for moving the windshield to open position when released from the frictional holding means, the frictional holding means being released by the momentum of the windshield when the vehicle comes to a sudden stop.

In testimony whereof, I affix my signature hereto.

FRANK J. HYLAND.